United States Patent
Cirulli et al.

(10) Patent No.: US 7,593,865 B2
(45) Date of Patent: Sep. 22, 2009

(54) BACK-END DATA ROUTING METHOD, SYSTEM AND PROGRAM PRODUCT

(75) Inventors: Susan B. Cirulli, Simpsonville, SC (US); Glenn C. Godoy, Endwell, NY (US); Mark A. Musa, Brackney, PA (US); Amy J. Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 10/688,567

(22) Filed: Oct. 17, 2003

(65) Prior Publication Data

US 2005/0086125 A1   Apr. 21, 2005

(51) Int. Cl.
   *G06Q 30/00* (2006.01)
(52) U.S. Cl. .................................................. 705/26
(58) Field of Classification Search ............... 705/26, 705/27; 707/1, 10, 104.5
See application file for complete search history.

(56) References Cited

U.S. PATENT DOCUMENTS

| | | | |
|---|---|---|---|
| 6,823,391 B1* | 11/2004 | Deen et al. | 709/229 |
| 6,876,977 B1* | 4/2005 | Marks | 705/26 |
| 6,983,278 B1* | 1/2006 | Yu et al. | 707/9 |
| 2002/0174247 A1* | 11/2002 | Shen | 709/238 |
| 2002/0198790 A1* | 12/2002 | Paulo et al. | 705/26 |
| 2003/0036966 A1 | 2/2003 | Amra et al. | |
| 2003/0040997 A1 | 2/2003 | Rousseau et al. | |
| 2003/0099237 A1 | 5/2003 | Mitra et al. | |
| 2005/0027610 A1* | 2/2005 | Wharton | 705/26 |
| 2005/0120121 A1* | 6/2005 | Guo et al. | 709/229 |

OTHER PUBLICATIONS

Das et al., "Economic ordering policy for dterministic two-echelon distribution systems", Amsterdam: Jul. 1991, vol. 21, p. 227, 5 pgs http://proquest.umi.com/pqdweb?did=1075455&sid=6&Fmt=2&clientId=19649&RQT=309&VName=PQD.*

* cited by examiner

*Primary Examiner*—Jeffrey A. Smith
*Assistant Examiner*—Mila Airapetian
(74) *Attorney, Agent, or Firm*—William E. Schiesser; Hoffman Warnick LLC

(57) ABSTRACT

Under the present invention, when a requestor submits a request for an item, a single, appropriate back-end system for processing the request is identified. Typically, the back-end system is identified based on the item requested and a location setting within the requestor's profile. The location setting generally indicates the requestor's geographic location and their job responsibility. Once a particular back-end system is identified, subsequent requests in the same order are limited to items that are associated with the identified back-end system. If the requester attempts to request an item that is not available via the identified back-end system, an error message is displayed.

23 Claims, 3 Drawing Sheets

BACK-END DATA ROUTING METHOD, SYSTEM AND PROGRAM PRODUCT

FIELD OF THE INVENTION

The present invention generally relates to a back-end data routing method, system and program product. Specifically, the present invention allows an appropriate back-end system to be identified to process a request based on the item requested and a location setting corresponding to a requestor.

BACKGROUND OF THE INVENTION

In business, it has become common for employees to request goods and services to perform essential job functions. Such requests can include items ranging from stationary and business cards to actual goods (e.g., chemicals) needed for production. As businesses become more computer dependent, many requests for items are made using one or more computer-based applications. For example, an employee seeking to order a particular item can log into a front-end system such as purchasing application, and browse available items for the one he/she needs. Upon locating the desired item, the employee can submit a request for the same. The request is the typically processed by a back-end system that interfaces with the appropriate item supplier.

Unfortunately, as efficient as computer-based item ordering can be, certain drawbacks are present. For example, it is often the case that multiple back-end systems are present within a single organization. To this extent, certain back-end systems could be responsible for obtaining certain items. For example, an organization could have a production procurement back-end system for processing requests for items needed for production/manufacturing, and a general procurement back-end system for processing requests for all other overhead items. Having multiple back-end systems is especially problematic where each back-end system has its own set of configurations. That is, each back-end system could have its own set of codes such as accounting codes, company codes, plant codes, location codes, tax codes, etc. Under such circumstances, validating the information entered by the user and bridging the front-end system to the multiple back-end systems can be a difficult and error prone process. Furthermore, the process of selecting an appropriate back-end system must remain invisible to the users.

In view of the foregoing, there exists a need for a back-end data routing method, system and program product. Specifically, a need exists for a system than can select an appropriate back-end system to process a request for an item in a manner that is invisible to a user. A further need exists for such a system to limit a request for an additional item in the same order based on the back-end system selected to process the original request.

SUMMARY OF THE INVENTION

In general, the present invention provides a back-end data routing method, system and program product. Specifically, under the present invention, when a requestor submits a request for an item, a single, appropriate back-end system for processing the request is identified. Typically, the back-end system is identified based on the item requested and a location setting within the requestor's profile. The location setting generally indicates the requestor's geographic location and their job responsibility. Once a particular back-end system is identified, subsequent requests in the same order are limited to items that are associated with the identified back-end system. If the requestor attempts to request an item that is not available via the identified back-end system, an error message is displayed.

A first aspect of the present invention provides a back-end data routing method, comprising: receiving a request for a first item from a requester; identifying a back-end system from a set of back-end systems for processing the request, wherein the back-end system is identified based on the first item and a location setting within a profile corresponding to the requestor; and limiting a request for a second item by the requestor to an item associated with the identified back-end system.

A second aspect of the present invention provides a back-end data routing system, comprising: an item display system for providing a set of available items to a requestor based on a location setting in a profile corresponding to the requestor; and a request system for receiving a request for a first item from the requester and for identifying a back-end system from a set of back-end systems for processing the request, wherein the back-end system is identified based on the item and the location setting, and wherein a request for a second item by the requestor is limited to an item associated with the identified back-end system.

A third aspect of the present invention provides a program product stored on a recordable medium for back-end data routing, which when executed comprises: program code for providing a set of available items to a requestor based on a location setting in a profile corresponding to the requestor; and program code for receiving a request for a first item from the requestor and for identifying a back-end system from a set of back-end systems for processing the request, wherein the back-end system is identified based on the item and the location setting, and wherein a request for a second item by the requestor is limited to an item associated with the identified back-end system.

Therefore, the present invention provides a back-end data routing method, system and program product.

BRIEF DESCRIPTION OF THE DRAWINGS

These and other features of this invention will be more readily understood from the following detailed description of the various aspects of the invention taken in conjunction with the accompanying drawings in which.

Is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the present invention provides a back-end data routing method, system and program product. Specifically, under the present invention, when a requestor submits a request for an item, a single, appropriate back-end system for processing the request is identified. Typically, the back-end system is identified based on the item requested and a location setting within the requestor's profile. The location setting generally indicates the requestor's geographic location and their job responsibility. Once a particular back-end system is identified, subsequent requests in the same order are limited to items that are associated with the identified back-end system. If the requestor attempts to request an item that is not available via the identified back-end system, an error message is displayed since the users are not generally allowed to add items that are not supported by the back-end system previously identified. It should be understood that as used herein, the term "item" is intended to refer to goods or services.

Figure 1:
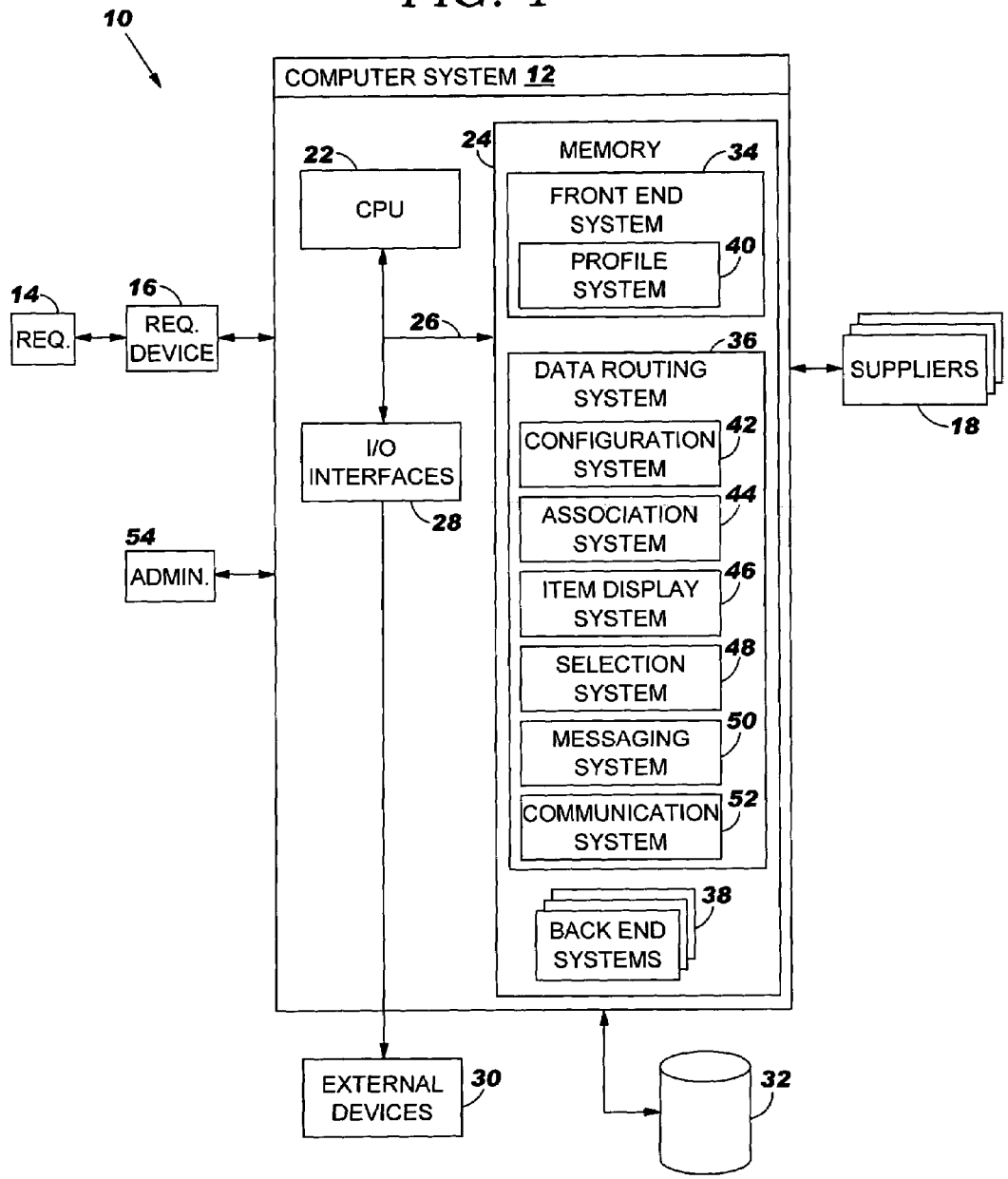
FIG. 1 depicts a back-end data routing system, according to the present invention.

Referring now to FIG. 1, a back-end data routing system 10 is shown. In general, requestor 14 will attempt to order items that are obtained from one or more suppliers 18. Under system 10, requestor 14 issues requests for items to computer system 12 via requestor device 16. The requests will be processed within computer system 12, which will communicate with the appropriate suppliers 18. Under the present invention, requestor device 16 is intended to represent any type of computerized system capable of communicating with computer system 12. For example, requestor device 16 could comprise a personal computing device such as a laptop, personal computer, hand held device, cellular phone, pager device, etc.). Moreover, requestor device 16 typically communicates with computer system 12 via a public network such as the Internet, or a private network such as a local area network (LAN), wide area network (WAN), a virtual private network (VPN), etc. To this extent, communication between computer system 12 and requestor device 16 could occur in a client-server environment via a direct hardwired connection (e.g., serial port), or via an addressable connection that may utilize any combination of wireline and/or wireless transmission methods. As such, the server and client may utilize conventional network connectivity, such as Token Ring, Ethernet, WiFi or other conventional communications standards. Moreover, connectivity could be provided by conventional TCP/IP sockets-based protocol. In this instance, the client would utilize an Internet service provider to establish connectivity to the server. It should be understood, however, that the architecture shown in FIG. 1 is intended to be illustrative only and that other variations are possible. For example, requester 14 could access computer system 12 directly without the use of requestor device 16. Further, the various systems shown in memory 24 of computer system 12 could be distributed among more than one computer system.

As depicted, computer system 12 generally includes central processing unit (CPU) 22, memory 24, bus, 26, input/output (I/O) interfaces 28, external devices/resources 30, and storage unit 32. CPU 22 may comprise a single processing unit, or be distributed across one or more processing units in one or more locations, e.g., on a client and server. Memory 24 may comprise any known type of data storage and/or transmission media, including magnetic media, optical media, random access memory (RAM), read-only memory (ROM), a data cache, a data object, etc. Storage unit 32 may comprise any type of data storage for providing more static storage of data used in the present invention. As such, storage unit 32 may include one or more storage devices, such as a magnetic disk drive or an optical disk drive. Moreover, similar to CPU 22, memory 24 and/or storage unit 32 may reside at a single physical location, comprising one or more types of data storage, or be distributed across a plurality of physical systems in various forms. To this extent, memory 24 and/or storage unit 32 can include data distributed across, for example, a LAN, WAN or a storage area network (SAN) (not shown).

I/O interfaces 28 may comprise any system for exchanging information to/from one or more external devices 30. External devices 30 may comprise any known type of external device, including speakers, a CRT, LED screen, hand held device, keyboard, mouse, voice recognition system, speech output system, printer, monitor/display, facsimile, pager, etc. Bus 26 provides a communication link between each of the components in computer system 12 and likewise may comprise any known type of transmission link, including electrical, optical, wireless, etc. In addition, although not shown, additional components, such as cache memory, communication systems, system software, etc., may be incorporated into computer system 12. It is understood that requestor device 16 typically includes the same components (e.g., CPU, memory, etc.) as shown and described with reference to computer system 12. These components have not been separately shown or discussed for brevity.

Shown in memory 24 is front-end system 34, data routing system 36 and back-end systems 38. Front-end system 36 is intended to represent any type of purchasing application now known or later developed with which requestor 14 can interface to request items. Back-end systems 38 can be any systems now known or later developed that receive request "data" from front-end system 34, and communicate with suppliers 18. In a typical embodiment, at least two back-end systems 38 are present. For example, a general procurement back-end system can be provided that is responsible for processing requests for items of a general nature that do not typically involve manufacturing or the like (e.g., stationary, etc.). Similarly, a production procurement back-end system can be provided that is responsible for processing requests for production-based items. Production-based items are those used to manufacture actual products. For example, if an organization is manufacturing circuit chips, a production-based item would be copper wire or silicon. Still yet, it could be the case that a single organization has multiple such back-end systems for its various locations. For example, one plant could have its own general procurement and production procurement back-end systems, while another plant could have its own general procurement and production procurement back-end systems. This could especially be the case where an organization is international and different sets of back-end systems are provided in each country. In any event, regardless of the quantity and disparity of back-end systems 38, the present invention provides data routing system 36 to bridge front-end system 34 with back-end systems 38 in a manner that is invisible and seamless to requestor 14.

Under the present invention, back-end systems can be added to system 10 using configuration system 42 of data routing system 36. In general, configuration system 42 allows an administrator 54 or the like to perform various mappings for back-end systems 38. For example, as indicated above, a single organization may have several back-end systems 38 depending on the types of items to be ordered, the physical locations within the organization, etc. Furthermore, each back-end system 38 might have its own set of configurations. For example, each back-end system 38 could have its own distinct commodity codes, company codes, plant codes, settings, etc. To help bridge front-end system 34 with these disparate back-end systems 38, configuration system 42 allows each of these configurations to be mapped to a particular standard. This allows all back-end systems 38 to communicate using the same codes or settings.

In any event, to request an item, requestor 14 would log into front-end system 34. As known, validation and/or authentication of requester 14 can be part of the log in process. Prior to requesting items, requestor 14 would need to establish a profile. To this extent, profile system 40 is shown within front-end system 34. It should be understood that although not shown, front-end system 34 would include other known subsystems. Further, even though profile system 40 is shown within front-end system 34, this need not be the case. Rather, profile system 40 could be provided in many alternate ways (e.g., within data routing system 36). In any event, requestor 14 will designate various pieces of information in establishing his/her profile. For example, requestor 14 could designate his/her name, address, etc. However, under the present invention, requestor 14 will also designate a location setting. The location setting generally comprises a geographic location of requestor 14 as well as a job responsibility. For example, if requestor 14 works out of his/her company's Fishkill, New York location, and requestor 14 is involved in "production" duties, requestor 14's location setting could be "Fishkill-Production." Once a profile with a location setting is established, it can be stored in storage unit 32.

Using the location setting within the profile, association system 44 of data routing system 36 will associate requestor 14 with a set (e.g., one or more) of back-end systems as well as available items he/she is permitted to request. Specifically, using the location setting, association system 44 will identify the applicable back-end systems 38 through which requestor can order items. As indicated above, an organization may have multiple back-end systems depending on the type of item being ordered as well as the location of the requestor 18. Association system 44 will associate requestor 14 with only those back-end systems that are applicable to requestor 14's location setting. In the example, above, requestor 14's location setting was "Fishkill-Production." Accordingly, requestor 14 will be associated with the production procurement and general procurement back-end systems that are used by the Fishkill location. This generally means that requestor 14 can request only those items that are available through Fishkill's production procurement or general procurement back-end systems. If requestor 14's location setting was "Fishkill-General," requestor 14 would only be able to request items available through Fishkill's general procurement back-end system. Accordingly, by associating requestor 14 with specific back-end systems 38, requestor 14 is also indirectly associated with particular items he/she can request. The association between requestor 14 and particular back-end systems 38 can then be stored in a table or the like in storage unit 32.

When requestor 14 later wishes to request an item, item display system 46 within data routing system 36 will access storage unit 32 and determine the back-end systems 38 with which requestor 14 is associated. Thereafter, item display system 46 will provide requestor 14 with a set of items that are available to him/her through the associated back-end systems. For example, based on requestor's 14 user name and/or password, item display system 46 can access the above-mentioned table in storage unit 32 to determine the associated back-end systems 38. Item display system 46 can then display to requestor 14 (e.g., via front-end system 34) a list of items that are available through those back-end system 38. Using the interfaces provided by front-end system 34, requestor 14 can then browse the set of available items and select a first item for purchase. In a typical embodiment, requestor 14 can select items in a "shopping cart" format. Regardless, once requestor 14 has requested the first item, the request is passed to data routing system 36 and received by selection system 48. Based on the type of item selected, a single, applicable back-end system 38 is identified and selected by selection system 48 from the set of back-end systems with which requestor 14 was associated. Specifically, if requestor 14 requested copper wire, the production procurement back-end system 38 (as opposed to the general-procurement system) with which requestor 14 was associated will be identified. As can be seen that the identification and selection of a single back-end system 38 for processing the request is based not only on the location setting corresponding to requester 14 (as explained above), but also on the actual item requested. Specifically, a set of applicable back-end systems is identified and associated with requester 14 base don the location setting. Thereafter, a single back-end system 38 is identified from the set to process a specific request based on the item requested.

Figure 2:
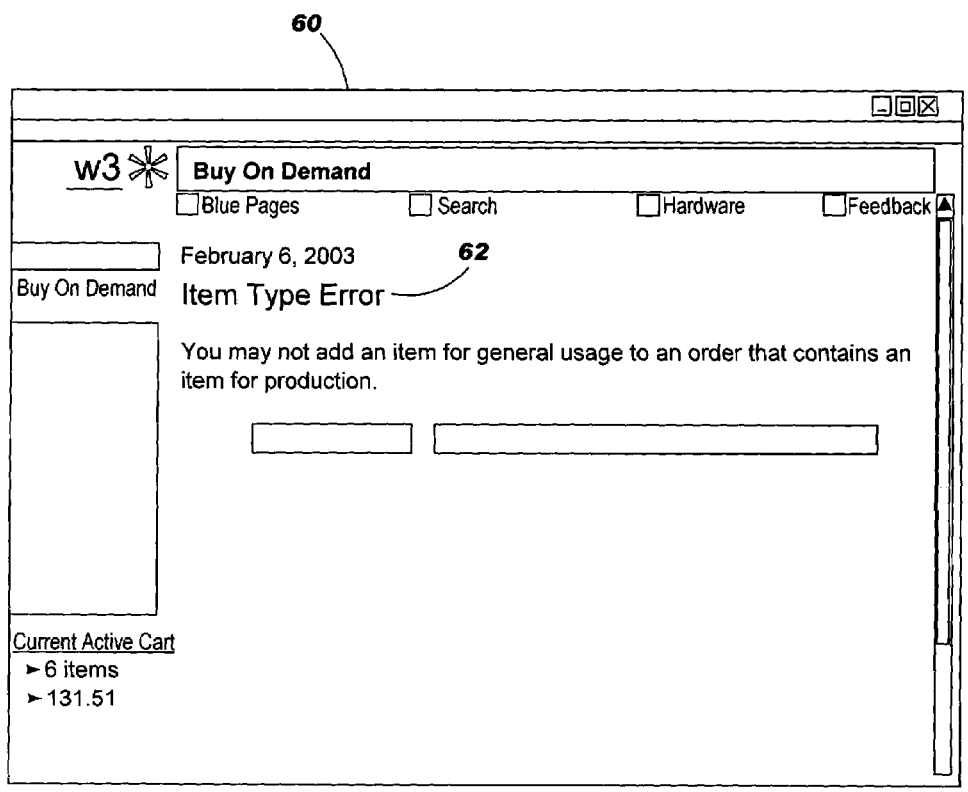
FIG. 2 depicts an illustrative view containing an error message, according to the present invention.

After the appropriate back-end system 38 is identified, subsequent requests by requestor 14 in the same order (shopping cart) are limited to only those items that are available through the same back-end system 38. For example, if requestor the submits a request for a second item, selection system 48 will receive the request and determine whether the item can be obtained via the identified back-end system 38. If it can, the item is added to the order. However, if the second item is not available through the identified back-end system, messaging system 50 will generate an error message for display to requestor 14. For example, if requestor 14 first requested a production procurement-based item, and then later requested a general procurement-based item, an error message would be displayed. Referring now to FIG. 2, an illustrative view 60 depicting an error message 62 is shown. Error message 62 indicates to requestor 14 that the item he/she has selected is not available via the identified back-end system 38. In general, when view 60 is displayed the requested item will not be added to the order. In any event, once requestor 14 has completed "shopping," the order will be routed to the identified back-end system 38 via communication system 52.

Figure 3:
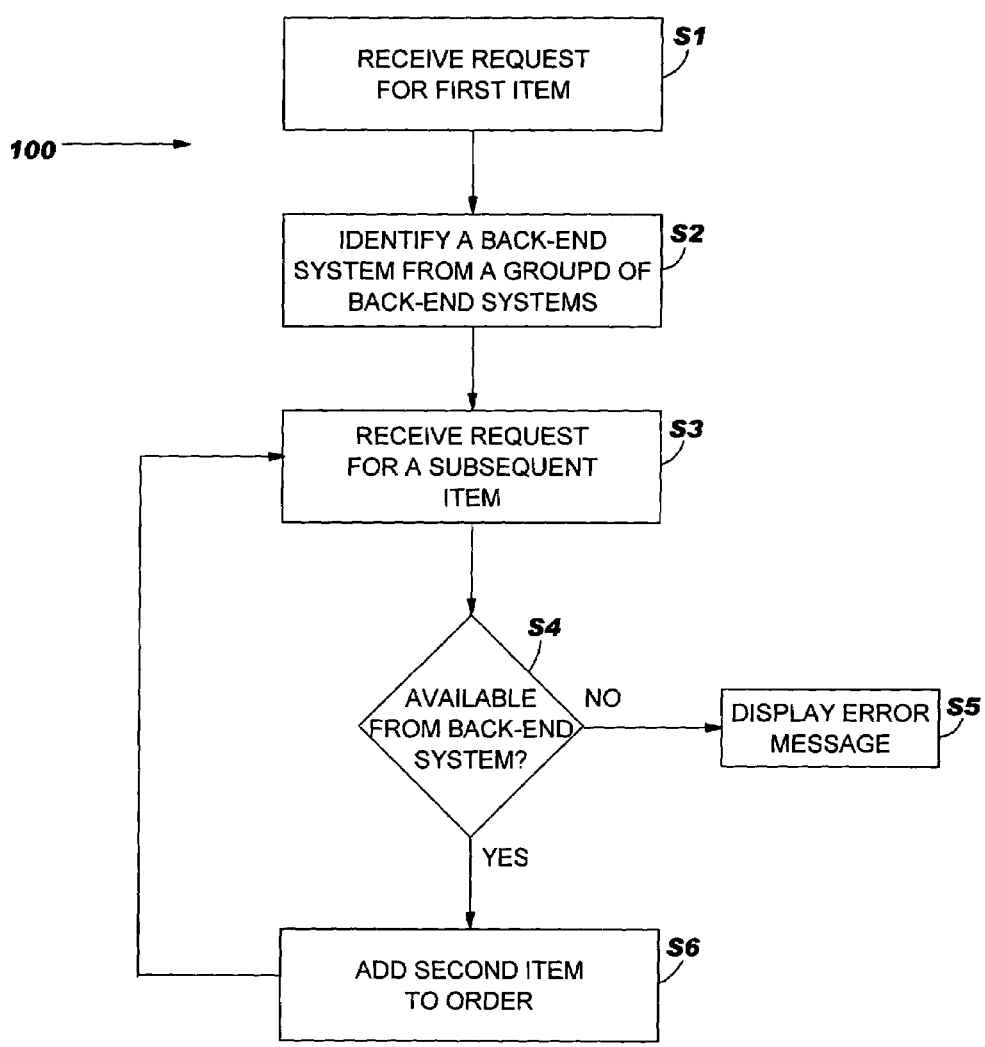
FIG. 3 depicts a method flow diagram, according to the present invention.

Referring now to FIG. 3, a method flow diagram 100 according to the present invention is shown. As depicted, first step S1 is to receive a request for a first item from a requester. Second step S2 is to identify a back-end system from a group of back-end systems for processing the request based on the item and a location setting from a profile corresponding to the requestor. Third step S3 is to receive a request for a second item from the requestor. Fourth step S4 is to determine whether the second item is available via the identified back-end system, if not, the request for the second item is denied in step S5. If, however, the second item is available via the identified back-end system, it is added to the order with the first item in step S6. The process can then repeat with requests for subsequent items.

It is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A back-end data routing method, comprising:
   receiving a request for a first item from a requestor via a unitary system for requesting items of different types;
   identifying a set of back-end systems based on a location setting within a profile corresponding to the requestor, the set of back end systems having a plurality of back-end systems that each pertains to a particular type of item and communicates with a supplier having the type of item, at least one of the set of back end systems having a type of item that differs from the type of item of another of the set of back end systems;
   wherein the location setting comprises a geographic location and an employment responsibility of the requestor;
   selecting a back-end system from the set of back-end systems for processing the request, wherein the back-end system is selected based on the type of item of the first item and the location setting within a profile corresponding to the requestor, wherein the first item is associated with a particular type of items;
   receiving a request for a second item from a requestor via the unitary system; and
   determining, via a computer device, whether the second item is included in the particular type of items associated with the selected back-end system and including the second item in the request only in case that the second item is included in the particular type of items associated with the selected back-end system.

2. The method of claim 1, further comprising establishing the profile, prior to the receiving step.

3. The method of claim 1, further comprising:
   associating the requestor with a set of available items to request and with the set of back-end systems based on the location setting; and
   providing the set of available items to the requestor, prior to the receiving step.

4. The method of claim 1, further comprising routing the request for the first item to the selected back-end system for processing.

5. The method of claim 1, further comprising receiving the request for the second item from the requestor.

6. The method of claim 5, further comprising displaying an error message if the second item is not associated with the selected back-end system.

7. The method of claim 1, further comprising:
   processing the request for the first item with the selected back-end system; and
   communicating with a supplier to obtain the first item.

8. A back-end data routing system, comprising:
   a computer device, including:
   an item display system for providing a set of available items of different types to a requestor based on a location setting in a profile corresponding to the requestor, wherein the location setting comprises a geographic location and an employment responsibility of the requestor; and
   a selection system
   for receiving a request for a first item from the requestor via the item display system,
   for identifying a set of back-end systems based on the location setting within a profile corresponding to the requestor, the set of back end systems having a plurality of back-end systems that each pertains to a particular type of item and communicates with a supplier having the type of item, at least one of the set of back end systems having a type of item that differs from the type of item of another of the set of back end systems;
   for selecting the back-end system from a set of back-end systems for processing the request, wherein the back-end system is selected based on the type of the item and the location setting, wherein the first item is associated with a particular type of items, and wherein a request for a second item by the requestor via the unitary system is limited to the particular type of items associated with the selected back-end system,
   for receiving a request for a second item from the requestor via the item display system; and
   for determining whether the second item is included in the particular type of items associated with the selected back-end system and including the second item in the request only in case that the second item is included in the particular type of items associated with the selected back-end system.

9. The system of claim 8, further comprising an association system for associating the requestor with the set of available items to request and with the set of back-end systems based on the location setting.

10. The system of claim 8, further comprising a communication system for routing the request for the first item to the selected back-end system for processing.

11. The system of claim 8, wherein the request system further receives the request for the second item from the requestor.

12. The system of claim 11, further comprising a messaging system for displaying an error message if the second item is not associated with the selected back-end system.

13. The system of claim 8, further comprising a profile system for establishing the profile.

14. The system of claim 8, wherein the group of back-end systems comprises a production procurement back-end system and a general procurement back-end system.

15. The system of claim 8, wherein the back-end system processes the request and communicates with a supplier to obtain the first item.

16. A program product stored on a recordable medium for back-end data routing, which comprises:
   program code for providing a set of available items of different types to a requestor based on a location setting in a profile corresponding to the requestor, wherein the location setting comprises a geographic location and an employment responsibility of the requestor; and
   program code for receiving a request for a first item from the requestor from the set of available items,
   for identifying a set of back-end systems based on a location setting within a profile corresponding to the requestor, the set of back end systems having a plurality of back-end systems that each pertains to a particular type of item and communicates with a supplier having the type of item, at least one of the set of back end systems having a type of item that differs from the type of item of another of the set of back end systems; and
   for selecting a back-end system from a set of back-end systems for processing the request, wherein the back-end system is selected based on the type of the item and the location setting, wherein the first item is associated with a particular type of items, and wherein a request for a second item by the requestor via the unitary system is limited to the particular type of items associated with the selected back-end system, for receiving a request for a second item from the requestor from the set of available items; and for determining whether the second item is included in the particular type of items associated with the selected back-end system and including the second item in the request only in case that the second item is included in the particular type of items associated with the selected back-end system.

17. The program product of claim 16, further comprising program code for associating the requestor with the set of available items to request and with the set of back-end systems based on the location setting.

18. The program product of claim 16, further comprising program code for routing the request for the first item to the selected back-end system for processing.

19. The program product of claim 16, wherein the program code for receiving further receives the request for the second item from the requestor.

20. The program product of claim 19, further comprising program code for displaying an error message if the second item is not associated with the selected back-end system.

21. The program product of claim 16, further comprising program code for establishing the profile.

22. The program product of claim 16, wherein the group of back-end systems comprises a production procurement back-end system and a general procurement back-end system.

23. The program product of claim 16, wherein the back-end system processes the request and communicates with a supplier to obtain the first item.

\* \* \* \* \*

UNITED STATES PATENT AND TRADEMARK OFFICE
CERTIFICATE OF CORRECTION

PATENT NO. : 7,593,865 B2  Page 1 of 1
APPLICATION NO. : 10/688567
DATED : September 22, 2009
INVENTOR(S) : Cirulli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Twenty-eighth Day of September, 2010

David J. Kappos
*Director of the United States Patent and Trademark Office*